United States Patent [19]
Abe, Jr.

[11] Patent Number: 5,703,563
[45] Date of Patent: Dec. 30, 1997

[54] ANTI-HIJACK SYSTEM

[75] Inventor: Dennis F. Abe, Jr., Hamburg, N.Y.

[73] Assignee: William T. Eby, College Park, Md.

[21] Appl. No.: 598,939

[22] Filed: Feb. 9, 1996

[51] Int. Cl.$^6$ .................................................. B60R 25/10
[52] U.S. Cl. ..................... 340/426; 340/428; 340/541; 180/287; 307/10.2
[58] Field of Search .................................. 340/426, 428, 340/425.5, 541; 307/10.2; 180/287

[56] References Cited

U.S. PATENT DOCUMENTS

| | | | |
|---|---|---|---|
| 4,958,142 | 9/1990 | Sayers | 340/426 |
| 5,318,147 | 6/1994 | Maefski | 180/287 |
| 5,402,000 | 3/1995 | Owens, II | 340/426 |
| 5,424,712 | 6/1995 | Rosenberger | 340/426 |
| 5,493,268 | 2/1996 | Lewis, Sr. et al. | 340/426 |

Primary Examiner—Thomas Mullen
Assistant Examiner—Timothy Edwards, Jr.
Attorney, Agent, or Firm—Harvey Kaye; Jerry Cohen

[57] ABSTRACT

An anti-hijack system which includes a nozzle arranged to be normally hidden from view mounted on the front section of a vehicle in the window well of the front windshield in such manner that the spray therefrom will impinge upon a person outside the vehicle and in the vicinity of the driver's door. As an alternative this can also be for both the driver's side and the passenger's side. The nozzle includes a diverter positioned to provide both cone and flat patterns of spray according to the arrangement thereof, and a spiral fluid director is positioned to effect the fluid spray as it ejects from the nozzle. There is a reservoir of incapacitating fluid adapted for mounting on a vehicle and hidden from view and a pump for forcing fluid from the reservoir through the nozzle under pressure to spray the fluid outwardly of the nozzle. If desired, a hot cap type capacitor can be used to provide voltage regulation so that vehicle voltage is always available for energizing the pump.

7 Claims, 6 Drawing Sheets

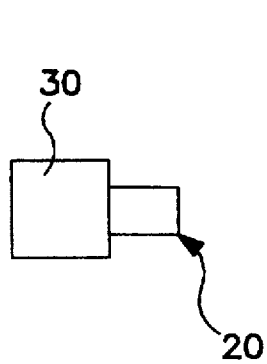 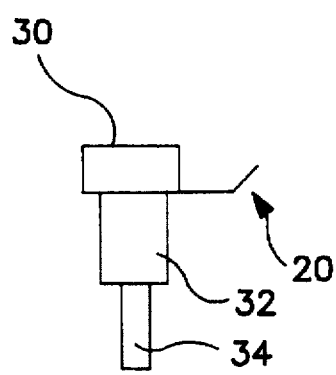 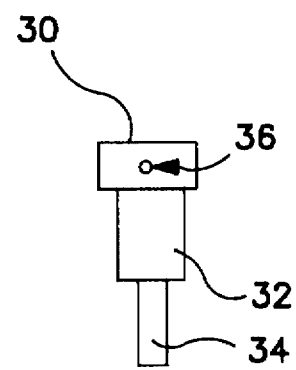
FIG. 4          FIG. 5          FIG. 6
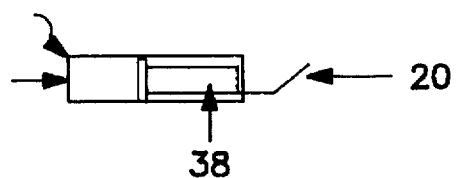
FIG. 7A
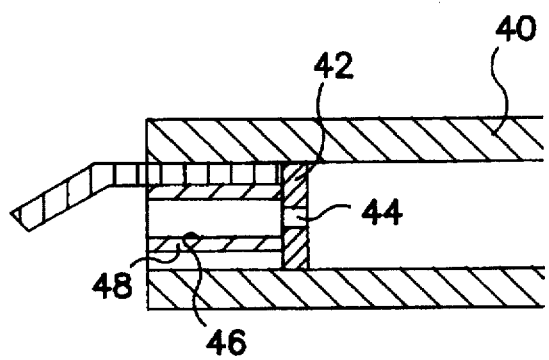
FIG. 7B

ANTI-HIJACK SYSTEM

FIELD OF THE PRESENT INVENTION

The present invention relates generally to the security art, and, more particularly, to an antihijacking system.

BACKGROUND OF THE INVENTION

U.S. Pat. No. 5,424,712 to Rosenberger discloses a carjacking defense system including a number of modules 35 on the outside of the vehicle and on the inside of the vehicle, which include a nozzle 50 for spraying and an infrared sensor. One of them can be located under the hood. The spray is from a pressurized tank from a pump 14 and tank 15 located under the hood, and sprays a nontoxic irritant.

U.S. Pat. No. 4,958,142 to Sayers for a Vehicle Theft Deterrent discloses a system for spraying with an atomized spray, a thief who is inside the vehicle. It is actuated with a timed delay from a vehicle alarm system.

U.S. Pat. No. 4,125,886 to D'Agostino for Protective Installation can be used in a taxi. The driver first arms the system, and, when he wants to send tear gas into the passenger compartment he presses the push-button 20 which sprays the tear gas through concealed nozzle 4.

U.S. Pat. No. 5,182,541 to Bajorek et al for Remote controlled Theft Deterrent System can be used on vehicles and discloses a remote controlled anti-theft device which issues a noxious gas into the inside of the vehicle when the system is actuated.

U.S. Pat. No. 5,280,268 to Matthews for Auto Anti-Theft System is for sending tear gas to the interior of the vehicle when an unauthorized person attempts to start the vehicle. Valve 60 releases tear gas from container 64 when the device is actuated, and issues it to the interior of the vehicle.

U.S. Pat. No. 3,656,658 to Iannetti for Intrusion Protection System can be used in a taxi to spray tear gas from nozzle 20 into the interior of the passenger seat area when a switch is closed.

U.S. Pat. No. 5,046,449 to Nelson for Vehicle Spray Apparatus and U.S. Pat. No. 3,259,050 to Grimm for Air Modifying System For Vehicles are of general interest showing other types of spray devices for use with vehicles. Note the Nelson device is used to send the spray to the exterior of the vehicle.

BRIEF SUMMARY OF THE INVENTION

It is a main object of the present invention to provide an anti-hijack system which performs more reliably and effectively than those of the prior art.

Another object of the present invention is to provide a protection system which is normally hidden from view.

A further object of the present invention is to provide an anti-hijack system for vehicles in which a disabling spray is ready at the driver's command to repel multiple attackers or intruders by spraying thousands of droplets per second.

A still further object of the present invention is to provide a rear seat activator button which is available for protection when placing children into child car seats.

Yet a further object of the present invention is to provide an anti-hijack system with a non-clogging nozzle that provides the flat and wide spray pattern that is desirable to deliver the solution in the most effective pattern installed out of view in the cavity at the base of the windshield and for cosmetic reasons, and which can be modified to provide a different pattern of spray when desired.

Still a further object of the present invention is to provide a tube type reservoir of a shape and material making it flexible and adaptable to installation into any vehicle engine compartment and which incorporates a pump in its body to make it one complete unit that can be quickly installed.

These and other object are accomplished by an anti-hijack system which includes a nozzle arranged to be normally hidden from view mounted on the front section of a vehicle in the window well of the front windshield in such manner that the spray therefrom will impinge upon a person outside the vehicle and in the vicinity of the driver's door. The nozzle includes a diverter positioned to provide both cone and flat patterns of spray according to the arrangement thereof, and a spiral fluid director is positioned to effect the fluid spray as it ejects from the nozzle. There is a reservoir of incapacitating fluid adapted for mounting on a vehicle and hidden from view and a pump for forcing fluid from the reservoir through the nozzle under pressure to spray the fluid outwardly of the nozzle. If desired, a hot cap type capacitor can be used to provide voltage regulation so that vehicle voltage is always available for energizing the pump.

Other objects, features and advantages will be apparent from the following detailed description of preferred embodiments taken in conjunction with the accompanying drawings in which:

BRIEF DESCRIPTION OF THE DRAWINGS

FIG. 4 is a diagrammatic elevation which is a top view of one type of surface mount nozzle.

FIG. 5 is a diagrammatic elevation which is a side view of the type of nozzle shown in FIG. 4.

FIG. 6 is a diagrammatic elevation which is a front view of the type of nozzle shown in FIG. 4.

FIG. 7A is a diagrammatic elevation showing a surface mount type nozzle.

FIG. 7B is a sectional view through the nozzle shown in FIG. 7A.

DETAILED DESCRIPTION OF THE DRAWINGS

In one of its embodiments, the present invention includes the following features:

1. location of the nozzle (in the window well of the front windshield) or another location from where the spray from the nozzle will impinge upon a person outside of the vehicle and in the vicinity of the driver's door and/or the passenger's side of the vehicle;

2. the construction of the nozzle including a diverter, to selectively provide cone and flat spray patterns, as well as an internal spiral in the nozzle itself or in the last few inches of the tubing between the nozzle and the pump or reservoir;

3. a "hot cap" to provide voltage regulation so that 12 volts is always available for energizing the pump;

4. the construction of which provides ease of installation including:

a. the reservoir design, and b. mounting of the nozzle; and 5. availability of remote actuation via infra-red (IR) or wireless communication.

Hot caps are really capacitors, but are known in the automotive trade as hot caps. They store a charge so that they will provide the electrical energy to still fire (energize) the pump at least one time even when the battery is not working fully (e.g., battery will not start the vehicle). Hot caps are not necessary, but they are desirable.

There may be a check valve between nozzle and reservoir to prevent evaporation under extreme heat conditions.

Figure 1:
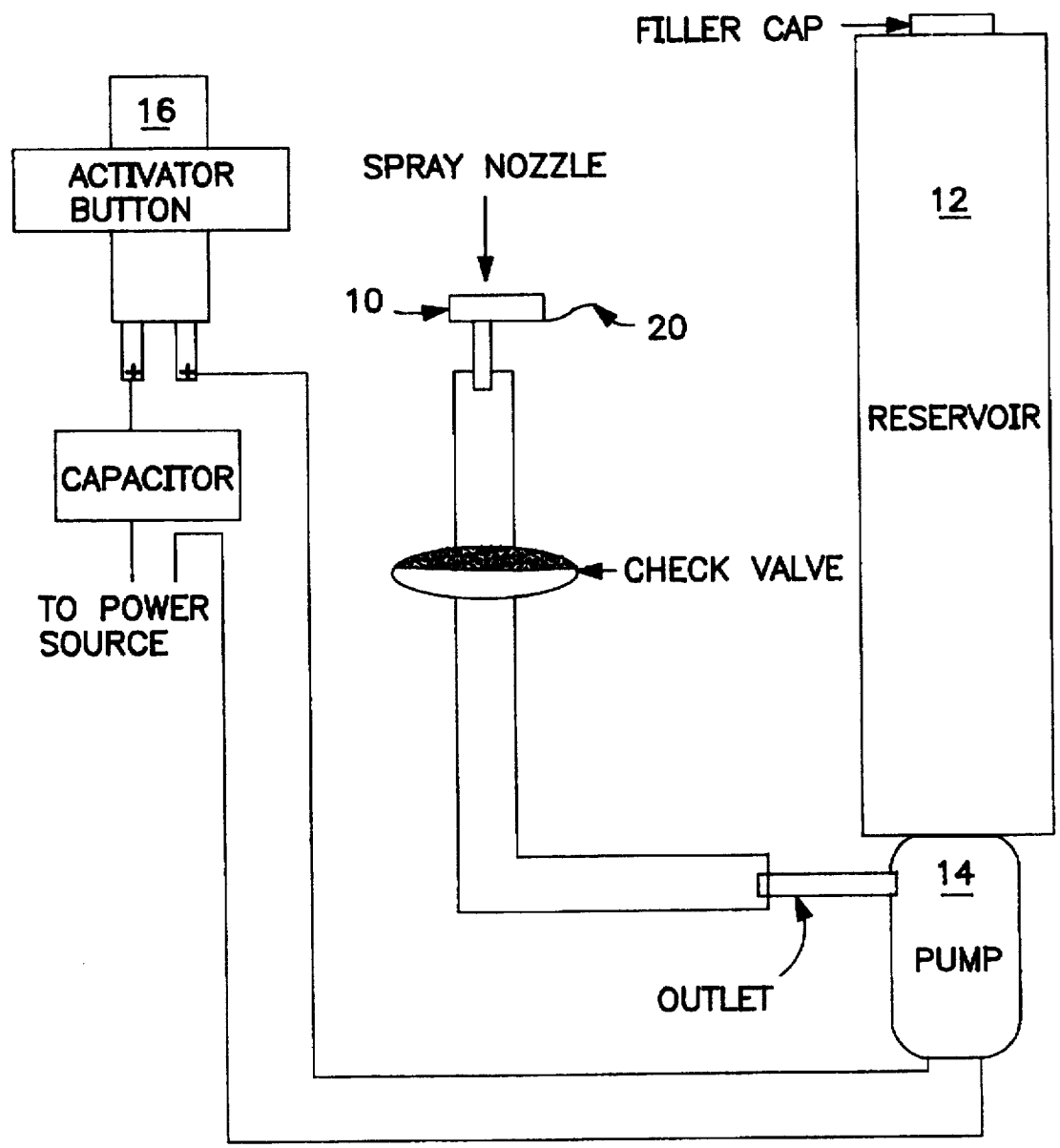
FIG. 1 is a diagrammatic view of the system of the present invention arranged to be actuated by pressing a button inside the vehicle.

The present invention can, in one embodiment as shown in FIG. 1, include a spray nozzle generally indicated at 10, a spray fluid reservoir generally indicated at 12 and a pump generally indicated at 14 so that when energized the pump will force fluid from the reservoir 12 to the nozzle 20.

The length of the tubing and wiring is determined by the location of the components during the installation process. The size of the pepper spray reservoir 12 is determined by available space on installation subject. The spray reservoir 12 and the pump 14 are preferably mounted under the hood or other cavity. The activator button 16 is manually operated, usually from the driver's seat. As described later it could also be a handheld infrared transmitter, or a wireless transmitter. A cigarette lighter plug 18 is also provided to energize the circuit. Thus 12 volt DC supply is provided from the vehicle battery. When activator button 16 is pressed the circuit is closed to complete the plus side connection and the vehicle battery provides energy to the pump 14 which forces fluid from reservoir 12 through the tubing to the spray nozzle 10.

The spray nozzle 10 is preferably mounted in the cavity at base of the windshield near the base of the windshield wiper arm. However, it could also be mounted in the front wheel well. In vans, a different arrangement may need to be used depending upon the configuration of the van.

A push of the button 16, reachable from the driver's seat, or from a handheld infrared or wireless transmitter button (see FIGS. 2 and 3) activates a strong defensive spray onto the attacker or intruder with pepper spray or other disabling fluid.

The system is ready at the driver's command to repel multiple attackers or intruders. One pinhead size droplet forces an attacker's eyes to close. The system sprays thousands of droplets per second. A rear seat activator button is available for protection when placing children into child car seats.

The activator button 16 can be mounted on the vehicle dash to be operated by hand or floor mounted for foot operation. The 12 volt source plug 18 may be plugged into the cigarette lighter receptacle or the system can be hard wired into the electrical system of the vehicle.

The completed device will deliver an effective shot of pepper spray solution. Under hood automobile usage requires the unit to operate from subzero to over 200 degrees Fahrenheit.

The pump 14 needs to be one which will not clog and which will provide low pressure. A single faucet marine pump is one type which was workable and is usable in one embodiment because it delivers the solution to the nozzles at the proper pressure to achieve the necessary spray pattern at an operating temperature range of −50 to 256 F.

Both the windshield cavity mount and surface mounted nozzles 10 are arranged to achieve a non-clogging nozzle that provides the flat and wide spray pattern that is desirable to deliver the solution in the most effective pattern. A Teflon coated venturi can be installed in the sprayhead body to provide clog free controlled delivery of solution to the external diverter 20. External diverters 20 provide the mechanical means to create the necessary spray pattern. Diverters 20 can be adjusted after installation with needle nose pliers to fine tune the installation. The size should be of the order of common sized windshield washer nozzles to allow room for installation and adjustment after being installed out of view in the cavity at the base of the windshield and for cosmetic reasons, on the surface mount style nozzle, used when the windshield mount cannot be used for some reason is not desired to be used.

For the delivery tubing 3/16" vinyl tubing can be used for the solution delivery lines to deliver the max/mum spray without clogging or collapsing. A purposely collapsed clear plastic tube (during testing) rebounded to its original shape when it was subjected to pressure from a single faucet pump. The tubing is preferably the durable all weather kind. The same acceptable results were not achievable using washer pumps or fuel injection pumps.

The tube type reservoir 12 is preferable for many applications because its shape makes it adaptable to any vehicle engine compartment. It also incorporates the pump in its body to make it one complete unit that can be quickly installed. Installation of the tube type unit can be performed in less than 2 minutes. Installations of other reservoirs can take as long as 2–4 hours. The reservoirs can be made of heat resistant, durable material.

Various activators can be used such as:

1. a basic-simple on/off button.

2. a. radio remote, or b. alarm type remote switch, (the latter not as desirable as the former);

3. infrared remote, with standard wiring circuit miniaturized and installed in key chain size case (such as a Radio Shack project case). A variety of sprays are usable with the system. For example, one, can also use a mosquito spray if there is a local problem with mosquitoes rather than hijackers. Also even for the hijacker type system, there are other sprays which will work, but the one listed below seems to operate best and is reasonably available at reasonable cost, at this time.

As the solution jalapeno type can be used, or if stronger spray is desired, a Habanero capsicum type can be used. It uses natural capsicum derived from naturally grown substances as its active ingredient. The capsicum is 10 times hotter than oleoresin capsicum used in conventional sprays. Oleoresin capsicum can also be used with the present invention. It includes an anti-freeze component or additive. A non-gumming formulation assures repeat and/or continuous performance. It should be non-toxic and non-lethal.

An important aspect of this invention is the location of the nozzle. One of the preferable locations is the area directly beneath the automobile windshield both to the passenger side and the driver's side of the vehicle. The nozzle can be positioned near the windshield wiper blades such as to allow for a sufficient spray pattern to be effective. This area also conceals the mounting.

The system can be installed in a vehicle and provide safety for the driver, children and other passengers from carjackers and other attackers. Rear seat activator is available for protection when placing children in carseats. This system is at the command of the vehicle driver to activate a strong defensive posture by spraying an attacker thoroughly with pepper spray, to immediately end of the encounter. It is ready at the driver's command to repel multiple attackers or intruders.

The effect of this system and the spray is instantaneous, the attacker/intruder will lose control of his faculties, thereby physically preventing an attacker/intruder from further aggressive activity. The causes inflammation of the eye capillaries and other mucus membranes resulting in immediate swelling and closing of the eyes, coughing, choking and nausea with extreme discomfort for up to two hours. No treatment is necessary, but cool water will relieve eye inflammation. All other symptoms will disappear within one or two hours. The system spray does no permanent damage.

It uses natural capsicum derived from naturally grown substances as its active ingredient. The capsicum is 10 times hotter than oleoresin capsicum used in conventional sprays. A non-gumming formula assures repeat and/or continuous performance. It is non-toxic and non-lethal. This system should only be used in a situation where one would be justified to subdue a violent encounter.

Figure 2:
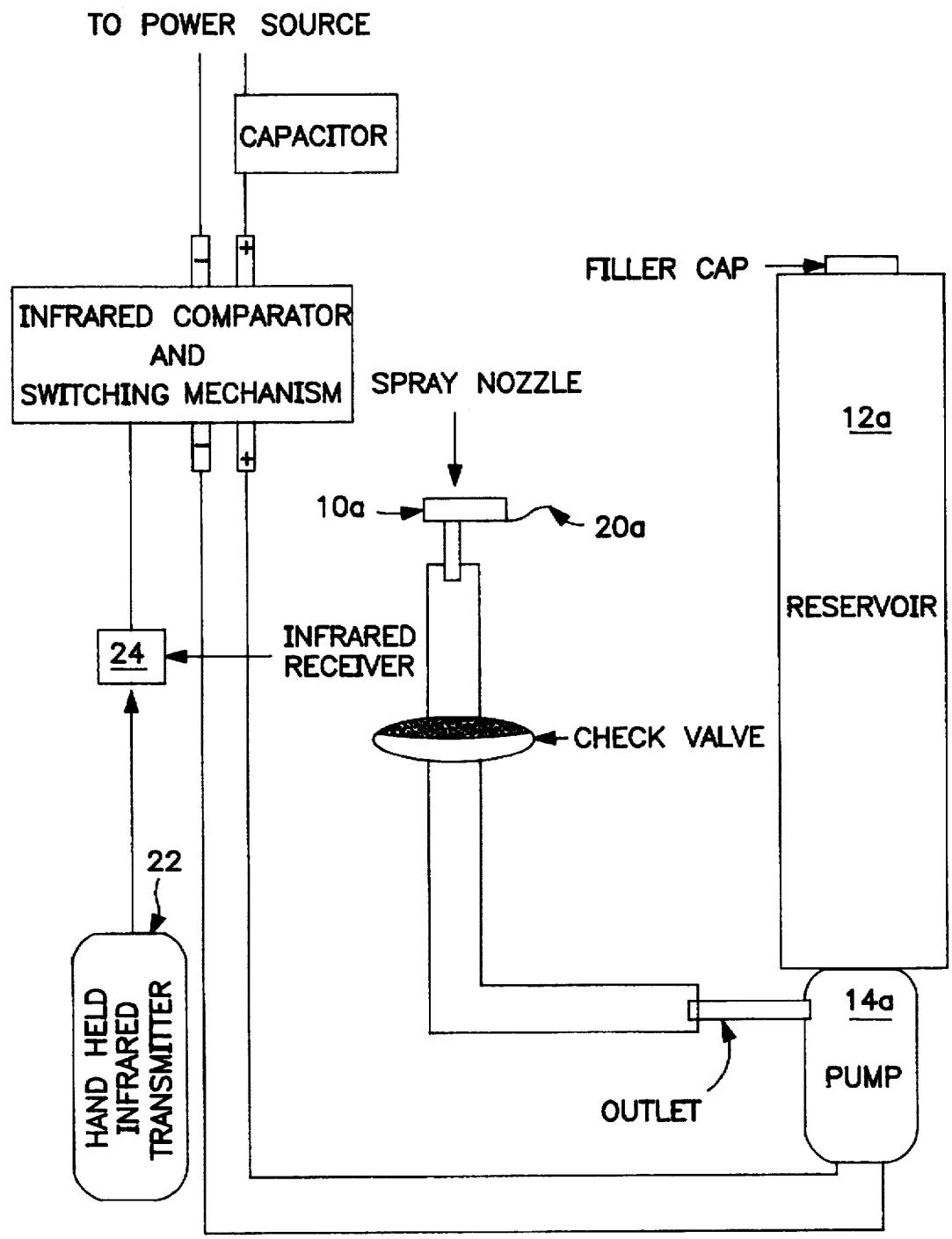
FIG. 2 is a diagrammatic view of the system of the present invention arranged to be actuated by an IR transmitter.

FIG. 2 shows another embodiment similar to that of FIG. 1, but in which an IR transmitter is used to activate the spray operation. There is a spray nozzle 10a, a spray fluid reservoir 12a and a pump 14a so when energized the pump provides fluid from the reservoir 12a to the nozzle 20a. Instead of actuator button 16, an IR system is used which includes a remote hand held IR transmitter 22 which emits a coded signal when actuated. This signal is received by IR receiver 24 mounted on the vehicle. The received coded signal is fed to an IR comparator and switching mechanism 26 which determines whether the correct code is being sent, and if it is, a switch is closed to provide energy from power source 18a to the pump 14a to force fluid from reservoir 12a to the nozzle 20a.

Figure 3:
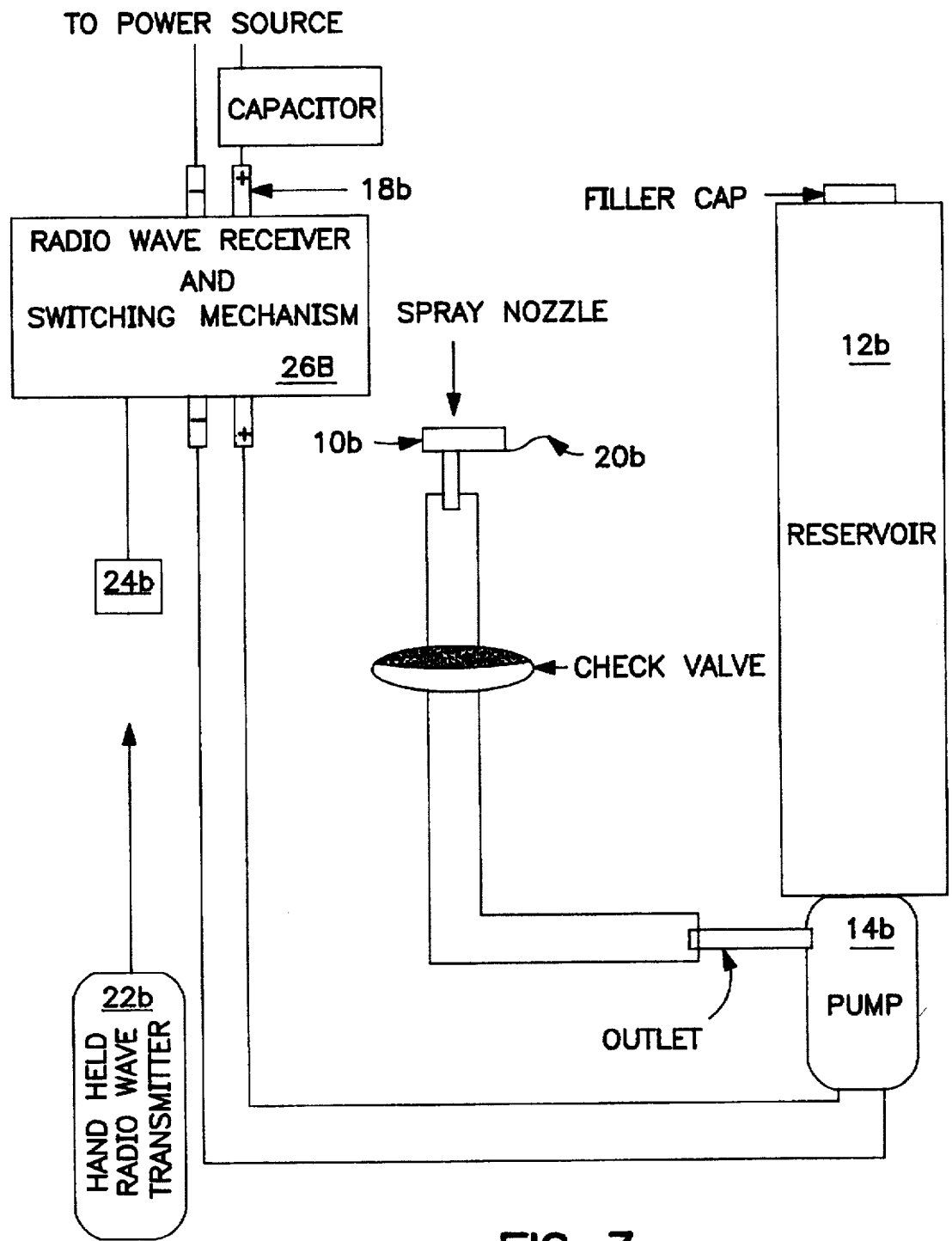
FIG. 3 is a diagrammatic view of the system of the present invention arranged to be actuated by a wireless transmitter.

FIG. 3 shows another embodiment similar to that of FIG. 2, but in which a wireless transmitter is used to activate the spray operation. There is a spray nozzle 10b, a spray fluid reservoir 12b and a pump 14b so when energized the pump provides fluid from the reservoir 12b to the nozzle 20b. Instead of a remote hand held IR transmitter, a wireless transmitter 22b is used and which emits a coded signal when actuated. This signal is received by wireless receiver 24b mounted on the vehicle. The received coded signal is fed to a wireless signal comparator and switching mechanism 26b which determines whether the correct code is being sent, and, if it is, a switch is closed to provide energy from power source 18b to the pump 14b to force fluid from reservoir 12b to the nozzle 20b.

A programmable chip can be used which includes the comparator to safeguard the system from determined tampering by issuing a unique code.

FIGS. 4, 5 and 6 show one type of nozzle with its diverter. FIG. 4 is a top view and typical dimensions would be one half inch per side for the square top, ⅜" length for the diverter and ¼" width. FIG. 5 is a side view showing the top of the nozzle 30 the connector 32 and tubing 34. The tubing can be of 3/16" diameter, and the connector 32 and be ½" long. FIG. 6 is a front view with the diverter not shown for clarity. There is a ⅛" exit port 36 in this embodiment.

A concealed type nozzle is shown in FIGS. 7A and 7B in which the tubing 40 with its internal opening has a plug with a collar 42 around its head and a bore 44 through the collar and a bore 46 through its shaft 48. The diverter 20 has a tight fit between the tubing and the shaft and is held firmly in place in this manner. As the fluid from the reservoir reaches the end of the tubing 40, it enters the plug through opening 44 in the collar 42. Since opening 44 is of smaller diameter that the internal diameter of the tubing, the pressure and thus the speed of the fluid flowing therethrough increases to a sufficient amount that a spray is created which flows outwardly through bore 46 and impinges upon the diverter to thus provide the desired spray.

When the spray hits the diverter (which may be made of copper) a flat spray can be obtained in thousands of droplets and can therefore reach people who are 7 feet tall. The diverter slides between the tubing and the nozzle and can be adjusted to direct the spray.

The system is constructed and arranged to deliver fluid directly from the pump head so that spray is not emitted under standing pressure. This is for safety to prevent accidental spraying, especially if a mechanic or other person happens to remove the tubing. Also, if further safety is desired, the system can be constructed so that prior to manual or remote actuation, and preliminary arming step can be required to place the system in ready condition to operate when the actuation button, manual or remote, is pressed.

The devices & parts needed for maximum full circle security are available over the counter for devices where there is no need for concern of size. Smaller items not on the shelf (miniature switch, nozzle) are available from local assemblers.

Figure 8:
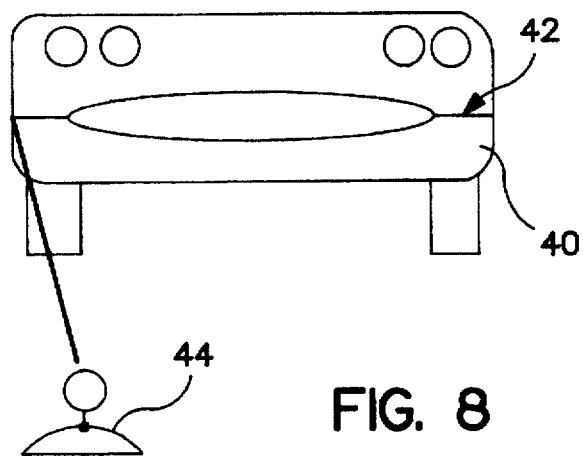
FIG. 8 is a diagrammatic view of a grille mounted nozzle.

In FIG. 8 there is shown an automobile front end discharge tube 42 routed through a grille cavity 40 or other frontal air intakes. Suction cups 44 hold the discharge tube in place.

Figure 9:
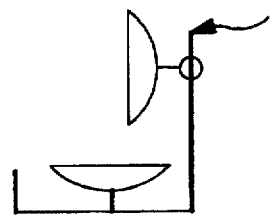
FIG. 9 is a diagrammatic view of the connection of a grille mounted nozzle.

In FIG. 9 there is shown a top view of a discharge tube 42 exiting grille cavity secured by suction cup 44 mounts discharges in front of front wheel, and which has the same coverage area as all other discharge locations.

Figure 10:
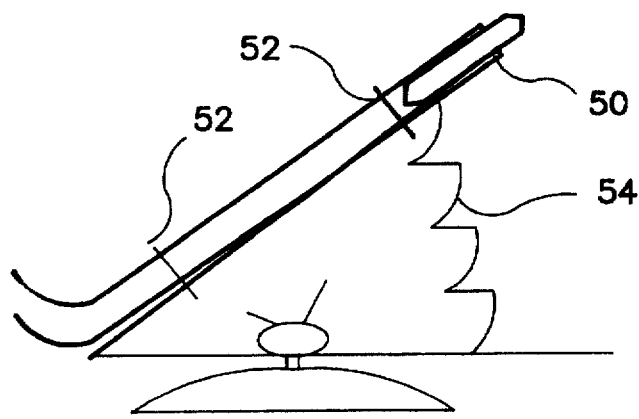
FIG. 10 is a diagrammatic side view of an adjustable nozzle mount using suction cup/adhesive mounting.

FIG. 10 shown one manner of providing an adjustable nozzle mount. A nozzle 50 is held by snap rings 52 to a one piece spring 54. There is a click stop adjustment movement and the tails are clipped as they are depressed during aiming adjustment. The mount is held in place by a suction cup or an adhesive, or affixed by a screw or the like.

Figure 11:
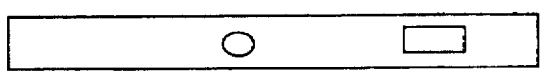
FIG. 11 is a diagrammatic bottom view of the mount shown in FIG. 10.

FIG. 11 shows a bottom view in which a suction cup mount opening or screw attaching hole is shown as is the click stop catch opening.

Figure 12:
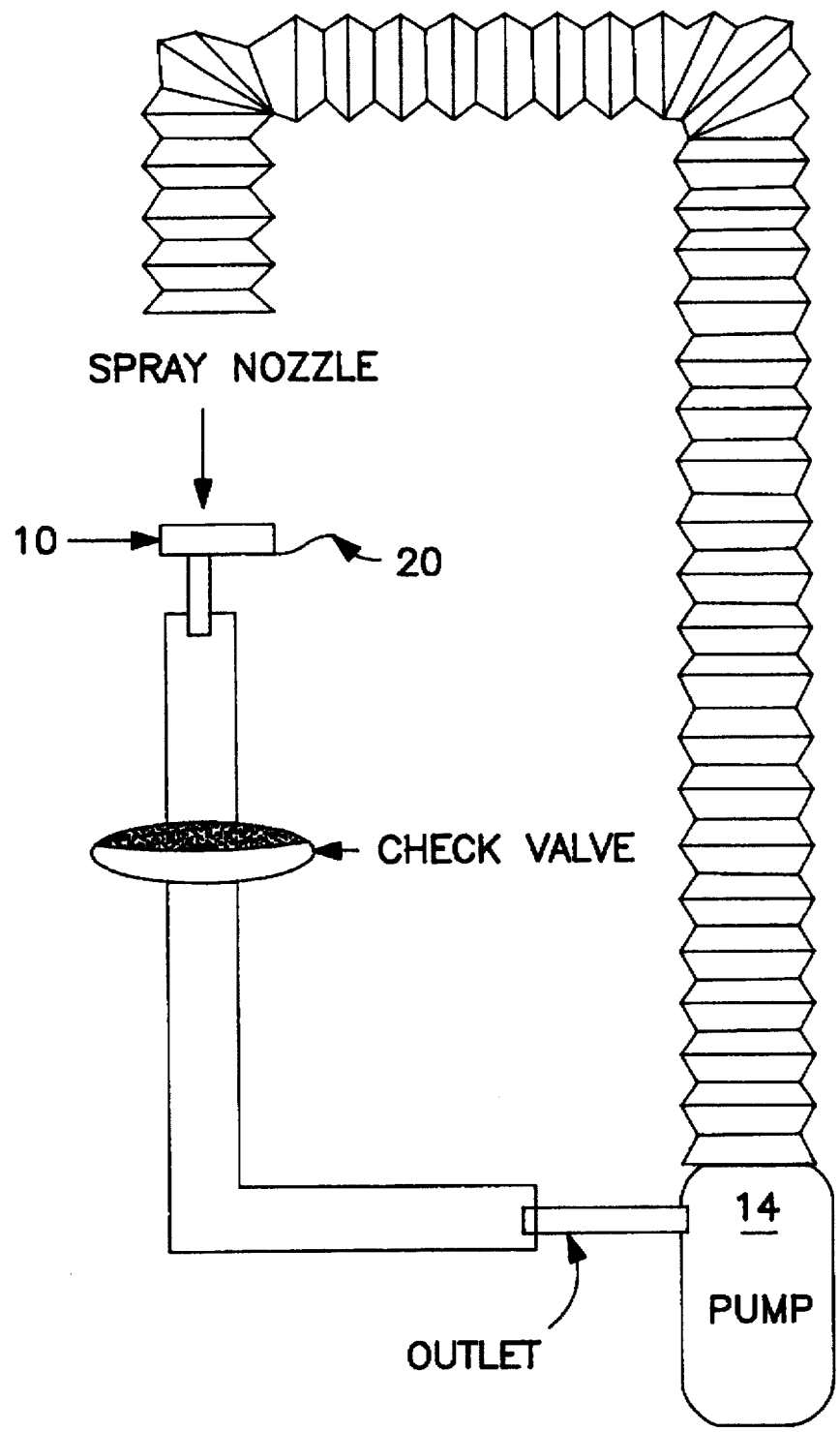
FIG. 12 is a diagrammatic view of the system showing the reservoir in bended form.

FIG. 12 shows a system including a flexible reservoir 12 which is bent to fit into the space available in a vehicle, such as under the hood.

When maximum security is required some special steps may be taken. Each type of unit has its own design and uses all off-the-shelf parts except that the nozzles must be used in all car installations and other areas where size and adjustability would be a major concern. It is powered by a 45 psi. pump. However, smaller psi pumps are used and work within the acceptable range of effectiveness. Even with its shear power concerns about clogging are the same as the smaller cylinder unit. High security car installations require the nozzles (multiple) of the present invention because their size gives them the ability to be mounted out of view. A 45 psi unit when used with the nozzles of the present invention can create a 30' circle which is impenetrable by man.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

I claim:

1. An anti-hijack system, comprising:
   a. a nozzle arranged to be normally hidden from view mounted on the front section of a vehicle in the window well of the front windshield in such manner that the spray therefrom will impinge upon a person outside the vehicle and in the vicinity of the driver's door, said nozzle including an adjustable diverter positioned to provide both cone and flat patterns of spray according to the adjustment thereof;
   b. a reservoir of incapacitating fluid adapted for mounting on a vehicle and hidden from view;
   c. a pump between said nozzle and pump for forcing fluid from said reservoir through said nozzle under pressure to spray said fluid outwardly of said nozzle; and
   d. a hot cap type capacitor to provide voltage regulation so that 12 volts is always available for energizing the pump.

2. An anti-hijack system as defined in claim 1, further comprising, a spiral fluid director positioned in the upstream of the exit of the nozzle to effect the fluid spray as it ejects from the nozzle.

3. An anti-hijack system as defined in claim 1 wherein the tip of the diverter is bendable to allow its shape and inclination with respect to the remainder of the diverter to be changed thereby to change the shape and target area of the spray.

4. An anti-hijack system as defined in claim 3 wherein an additional nozzle is arranged to be attached to or through the grille of a vehicle.

5. An anti-hijack system, comprising:
   a. a nozzle arranged to be mounted on the front section of a vehicle in such manner that the spray therefrom will impinge upon a person outside the vehicle and in the vicinity of the driver's door, said nozzle including an adjustable diverter positioned to provide both cone and flat patterns of spray according to the adjustment thereof;
   b. a reservoir of incapacitating fluid adapted for mounting on a vehicle and hidden from view; and
   c. a pump between said nozzle and pump for forcing fluid from said reservoir through said nozzle under pressure to spray said fluid outwardly of said nozzle.

6. An anti-hijack system as defined in claim 5 where the nozzle is mounted on or through the grille of a vehicle.

7. An anti-hijack system as defined in claim 5, further comprising:
   d. a hot cap type capacitor to provide voltage regulation so that 12 volts is always available for energizing the pump.

* * * * *